(12) United States Patent
Urie et al.

(10) Patent No.: US 6,961,138 B1
(45) Date of Patent: Nov. 1, 2005

(54) IMAGE FORMING DEVICES AND IMAGE FORMING METHODS

(75) Inventors: Cooper G. Urie, Boise, ID (US); James DuBois, Star, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 996 days.

(21) Appl. No.: 09/639,450

(22) Filed: Aug. 15, 2000

(51) Int. Cl.[7] ............................. G06F 15/00; G06K 1/00
(52) U.S. Cl. ..................... 358/1.15; 358/1.16; 358/1.1; 358/1.14; 358/1.9
(58) Field of Search .................. 358/1.1, 1.9, 1.11, 358/1.15, 1.14

(56) References Cited

U.S. PATENT DOCUMENTS

| | | | |
|---|---|---|---|
| 5,832,192 A * | 11/1998 | Hino | 358/1.16 |
| 6,333,790 B1 * | 12/2001 | Kageyama | 358/1.15 |
| 6,337,961 B2 * | 1/2002 | Mori et al. | 399/82 |
| 6,375,297 B1 * | 4/2002 | Hayashi et al. | 347/14 |
| 6,665,089 B1 * | 12/2003 | Austin et al. | 358/1.18 |
| 6,683,696 B1 | 1/2004 | Urie et al. | |

OTHER PUBLICATIONS

"McGraw-Hill Electronics Dictionary"; Sixth Edition; 1997; pp. 174.

* cited by examiner

Primary Examiner—Gabriel Garcia
Assistant Examiner—Thierry Pham

(57) ABSTRACT

Image forming devices and image forming methods are provided. According to a first aspect of the invention, an image forming device includes a processor configured to process executable instructions; a storage configuration configured to store image data, plural instruction components, and a dynamic application, wherein the instruction components individually comprise plural executable instructions configured to cause the processor to perform an operation with respect to formation of images, and the dynamic application comprises plural executable instructions configured to cause the processor to associate the dynamic application with at least one of the instruction components and to perform an operation with respect to the at least one associated instruction component; an input/output interface configured to communicate the image data and the dynamic application externally of the image forming device; and an engine configured to form images upon media responsive to the image data.

23 Claims, 7 Drawing Sheets

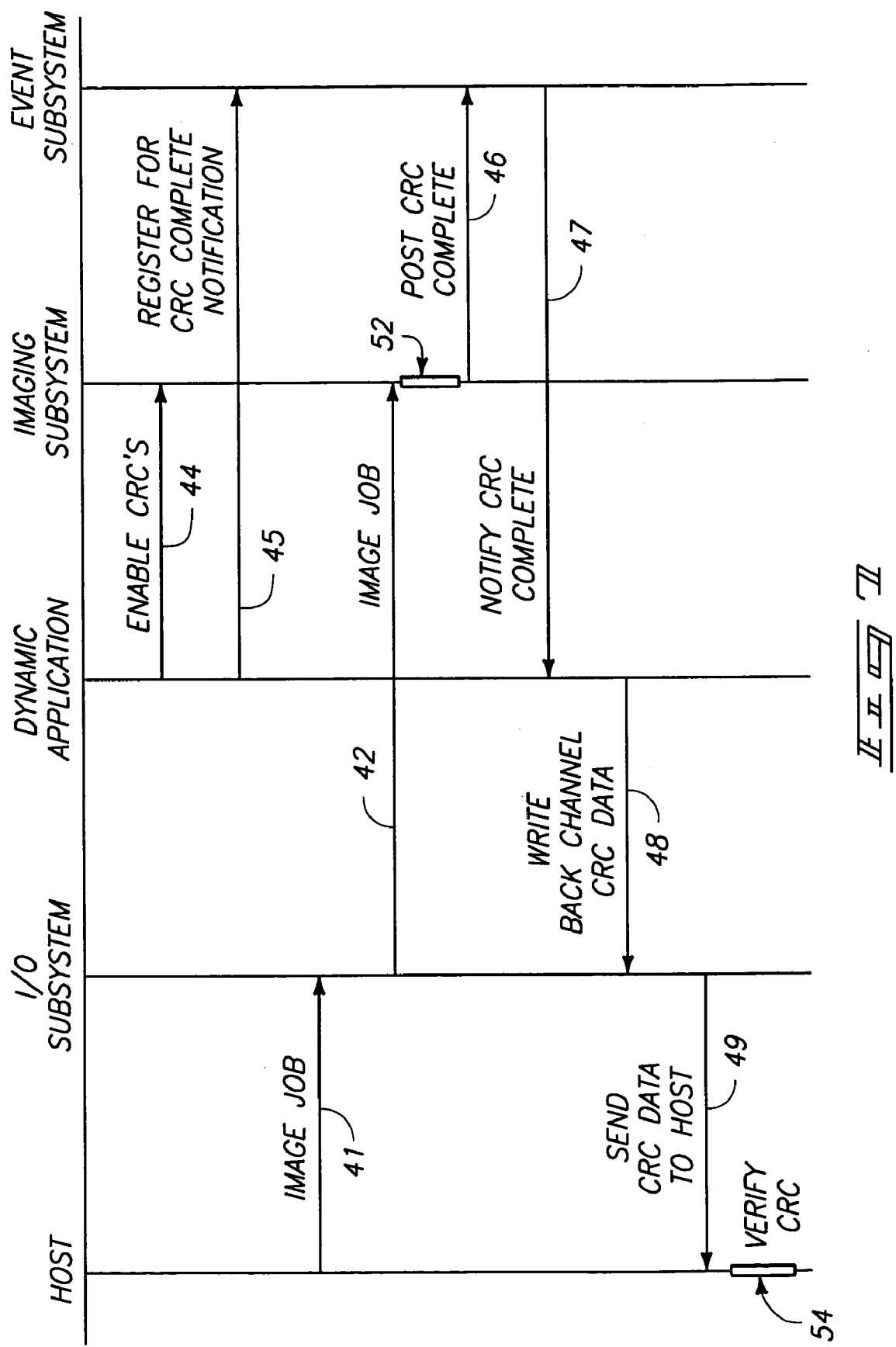

IMAGE FORMING DEVICES AND IMAGE FORMING METHODS

FIELD OF THE INVENTION

The invention relates to an image device and an image forming method.

BACKGROUND OF THE INVENTION

Conventional printers including ink jet and laser printers are typically coupled with a host computer system which is configured to interface with the appropriate printer. The host system usually downloads a print job to the printer via an appropriate connection. Typical printers are configured to parse the incoming data, rasterize the data and print an image upon media.

Some conventional arrangements provide a page description language (PDL) driver within the host computer system. Exemplary page description languages include PCL and PostScript™. The associated printer includes one or more parsers which are configured to operate in conjunction with the appropriate page description language drivers of the host computer system. The attached printer usually has plural page description language parsers for use with multiple drivers. Following processing within the appropriate page description language parser, the received data is rasterized and applied to the print engine of the printer.

Executable instructions are implemented as firmware in numerous conventional printer arrangements. The firmware is provided within various read only memory (ROM) storage devices in many conventional devices. Accordingly, some conventional printer arrangements are relatively inflexible and do not easily accommodate changes to firmware to accommodate changes in imaging technology or provide for additional applications.

Therefore, a need exists to provide improved image forming devices and methodologies which overcome these shortcomings of prior devices. For example, it is often desired to verify or test operation of the printer or other image forming device before it leaves the factory for shipment to a customer. Verification or test operations may be implemented as executable instructions which instruct the image forming device to conduct a desired operation and thereafter results of the desired operation may be analyzed to confirm proper operation. Following usage in the factory, such verification or test instructions are not necessary for proper operation but are often unnecessarily shipped with the product thereby consuming otherwise useable resources.

SUMMARY OF THE INVENTION

The invention provides image forming devices and image forming methods.

According to a first aspect of the invention, an image forming device comprises: a processor configured to process executable instructions; a storage configuration configured to store image data, plural instruction components, and a dynamic application, wherein the instruction components individually comprise plural executable instructions configured to cause the processor to perform an operation with respect to formation of images, and the dynamic application comprises plural executable instructions configured to cause the processor to associate the dynamic application with at least one of the instruction components and to perform an operation with respect to the at least one associated instruction component; an input/output interface configured to communicate the image data and the dynamic application externally of the image forming device; and an engine configured to form images upon media responsive to the image data.

Another aspect of the invention provides an image forming method comprising: providing an image forming device including a processor and an engine configured to form images upon media; providing plural instruction components individually including plural executable instructions configured to cause the processor to perform an operation with respect to the formation of images; communicating a dynamic application relative to the image forming device; and associating the dynamic application with at least one of the instruction components, the dynamic application including plural executable instructions configured to cause the processor to perform an operation with respect to the at least one associated instruction component.

Yet another aspect of the present invention provides an image forming method comprising: providing an image forming device including a processor and a print engine configured to print images upon media; providing plural instruction components individually including plural executable instructions configured to cause the processor to perform an operation with respect to the formation of images; receiving a dynamic application within the image forming device; first identifying the dynamic application after the receiving; second identifying at least one instruction component after the first identifying; associating the dynamic application with the at least one instruction component after the second identifying, the associating including establishing a runtime linkage of the dynamic application with an application program interface of the at least one instruction component, the dynamic application including plural executable instructions configured to cause the processor to perform an operation with respect to the at least one associated instruction component including storage of data corresponding to the operation; outputting the stored data from the image forming device; and disabling the dynamic application.

Other features and advantages of the invention will become apparent to those of ordinary skill in the art upon review of the following detailed description, claims, and drawings.

DESCRIPTION OF THE DRAWINGS

FIG. 7 is a sequence diagram illustrating exemplary operations of the image forming device corresponding to FIG. 6.

DETAILED DESCRIPTION OF PREFERRED EMBODIMENTS

Figure 1:
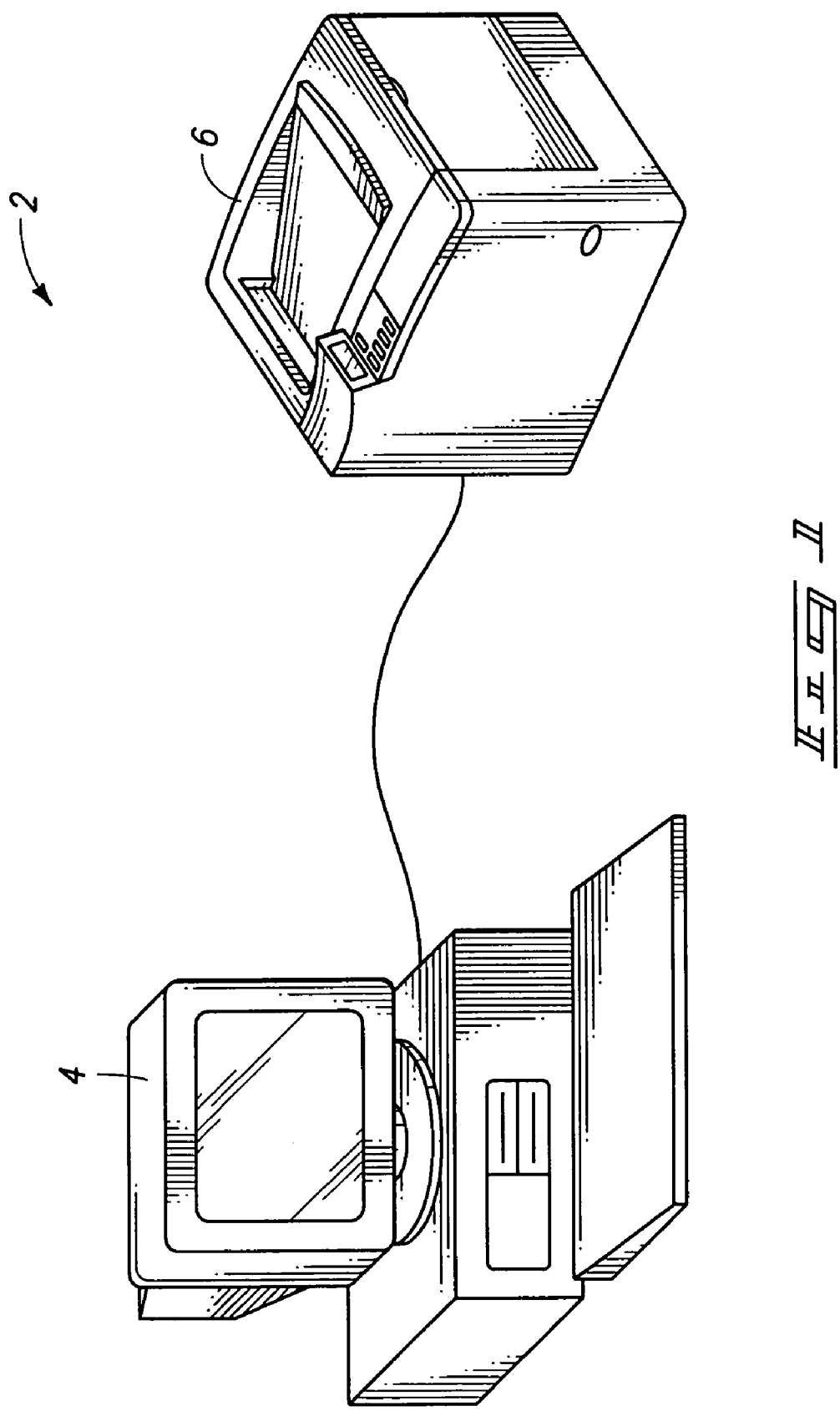
FIG. 1 is an isometric view of an exemplary image forming system according to aspects of the present invention.

Referring to FIG. 1, an exemplary image forming system 2 embodying aspects of the present invention is shown. The depicted image forming system 2 includes a host device 4 coupled with an image forming device 6. In the depicted arrangement, host device 4 is implemented as a personal computer (PC), workstation or other digital processing device, and image forming device 6 is implemented as a printer, such as a laser printer or ink jet printer. The present invention is not limited to the disclosed arrangement but is applicable to other image forming systems. Other possible host devices are contemplated as well as other image forming devices including, for example, peripheral devices, facsimiles, copiers, and multiple function peripheral devices.

Figure 2:
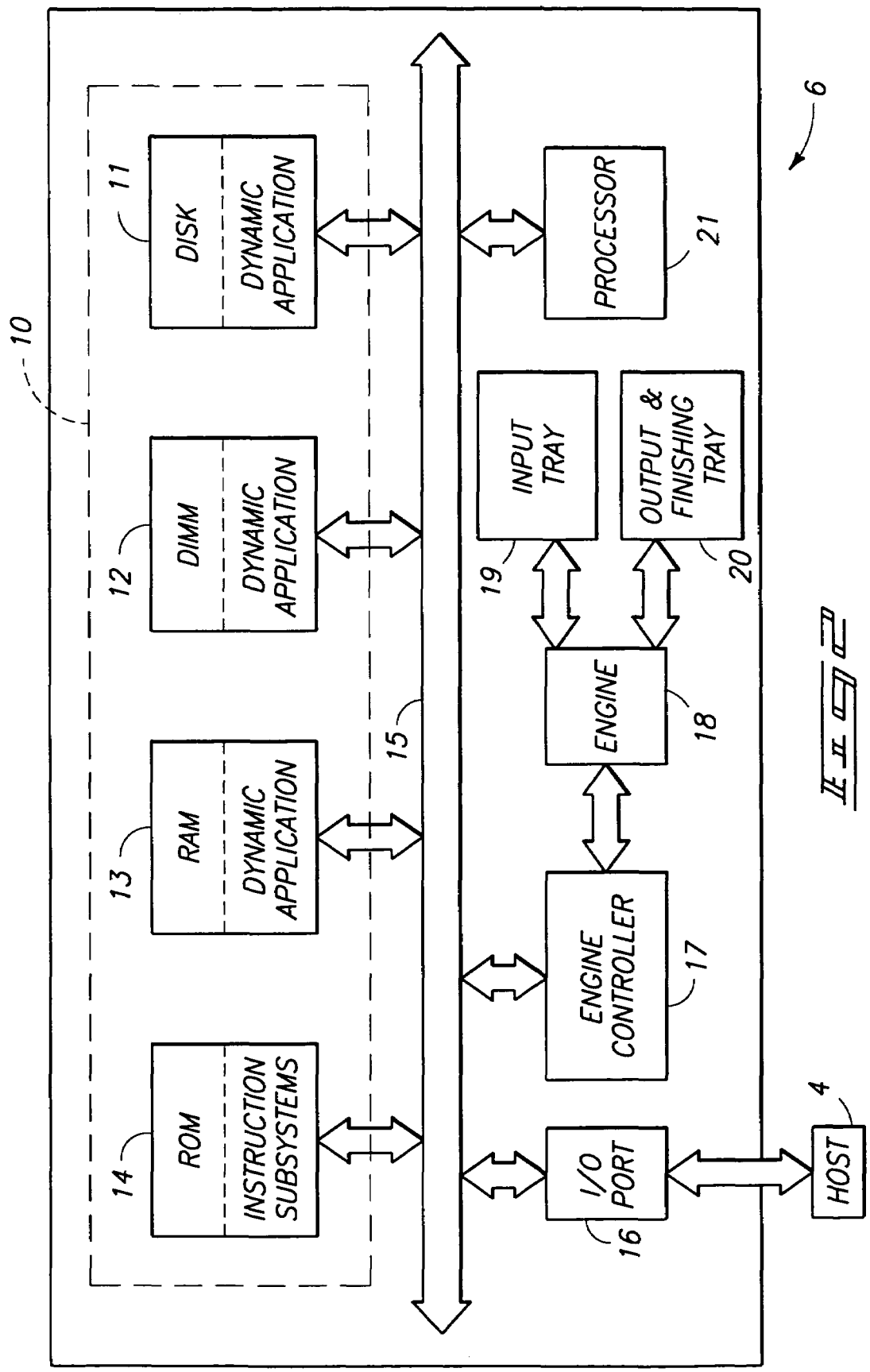
FIG. 2 is a functional block diagram illustrating exemplary hardware components of an image forming device of the system of FIG. 1

Referring to FIG. 2, hardware of an exemplary configuration of image forming device 6 comprising a printer is illustrated. The depicted embodiment of image forming device 6 comprises a storage configuration 10 including a plurality of storage devices individually configured to store digital data including image data (e.g., print job data), instruction components, and/or a dynamic application as described below. The depicted storage configuration 10 includes a hard disk drive storage device 11, dual-in-line-memory module (DIMM) device 12, random access memory (RAM) device 13, and read only memory (ROM) device 14. Individual storage devices 12, 13, 14 are coupled with a bi-directional bus 15. Other embodiments of storage configuration 10 are possible.

Additional hardware of the depicted image forming device 6 includes an input/output (I/O) port 16, engine controller 17, engine 18, input tray 19 and output and finishing tray 20. Image forming device 6 additionally includes a processor 21, such as a microprocessor, configured to process executable instructions (e.g., software and/or firmware instructions) to control functions of image forming device 6. Further discussion regarding an exemplary arrangement of executable instructions for processing by processor 21 is provided below with reference to FIG. 3. Processor 21 communicates with other hardware elements of image forming device 6 via bus 15.

I/O port 16 comprises one or more input/output device adapted to couple with host 4 external to image forming device 6. I/O port 16 can comprise a parallel interface which provides bidirectional communications between image forming device 6 and host 4. I/O port 16 communicates image data such as page description language data (or raster data) as well as dynamic applications with respect to host 4 in accordance with the described embodiment.

Engine controller 17 and associated engine 18 are coupled to bus 15 and provide print output capability for image forming device 6 in but one embodiment. In the described arrangement, engine controller 17 and engine 18 implement printing functionality. As mentioned previously, other configurations in addition to printer configurations are possible. Sheet media is pulled from input tray 19 into engine 18 and subsequently directed to output and finishing tray 20. Output and finishing tray 20 includes, in an exemplary embodiment, finishing feature mechanisms such as sheet registration, binding, stapling, punching, and the like, and may include one or more bins for collation or "mailbox" usage purposes. Input tray 19 may also include a plurality of input trays for varied media selection.

According to the described embodiment, engine 18 is a multi-resolution capable engine. For example, it can print, selectively, at 600 or 1200 dots per inch (dpi). For purposes of this disclosure, engine 18 is a laser printer engine that employs an electrophotographic drum imaging system. Other image forming systems are utilized in other embodiments.

Random access memory (RAM) 13 provides main memory storage capabilities within image forming device 6 for storing and processing job data streams received from host 4. Random access memory 13 can comprise dynamic random access memory (DRAM) in an exemplary embodiment. Read only memory (ROM) 14 contains instruction components which control the operation of processor 21 and image forming device 6. Exemplary instruction components comprise firmware code stored in ROM 14 and described immediately below.

Figure 3:
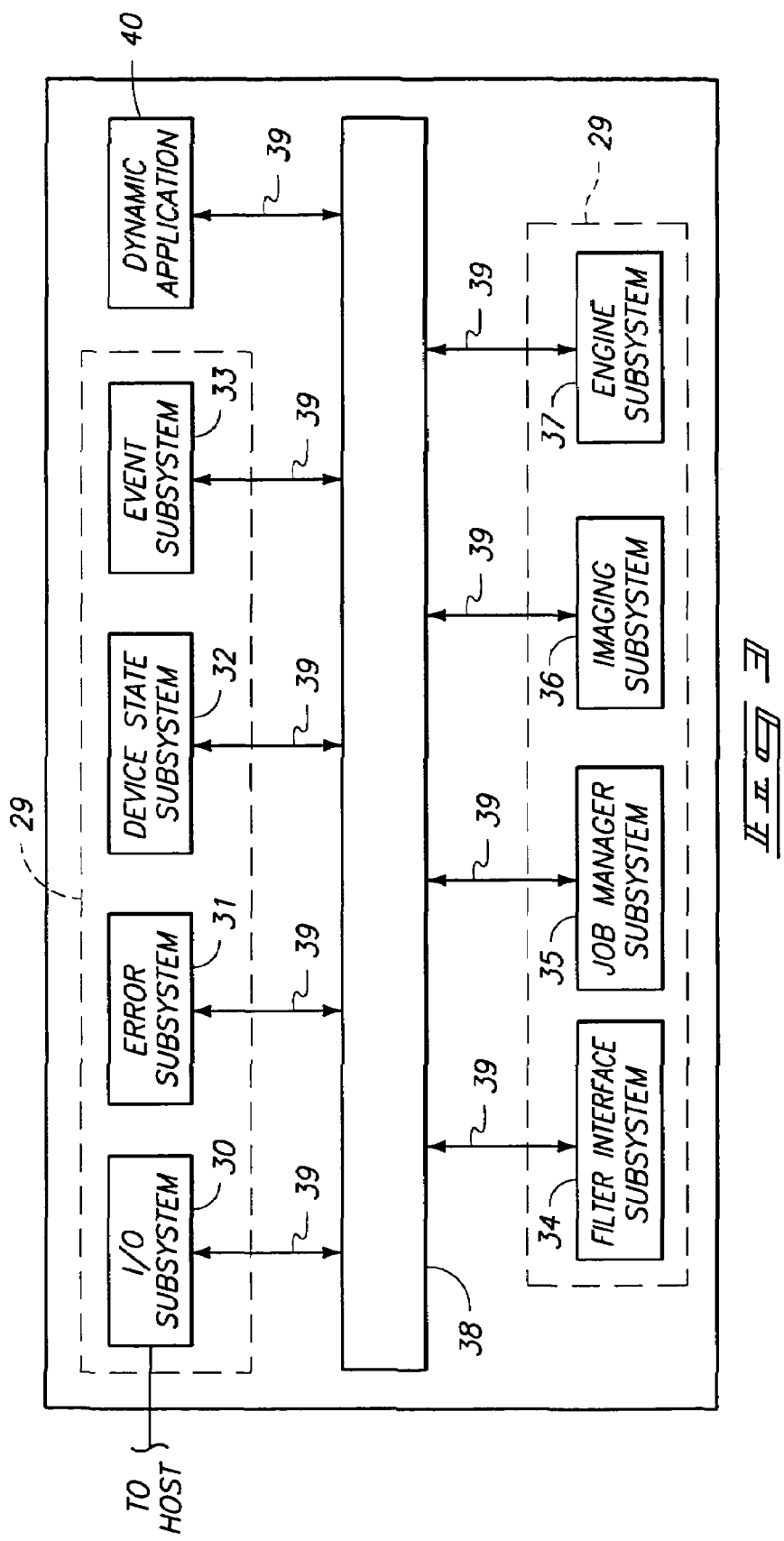
FIG. 3 is a functional block diagram illustrating exemplary instruction components of the image forming device shown in FIG. 2.

Referring to FIG. 3, exemplary instruction components of image forming device 6 are depicted. Instruction components of the embodiment of the present invention described herein are illustrated with references 30–37. Such instruction components 30–37 may be referred to as base firmware 29 according to one aspect of the present invention. Instruction components individually comprise a plurality of executable instructions configured to cause processor 21 to perform operations with respect to formation of images and other desirable operations by image forming device 6. More specifically, in the described arrangement, instruction components comprise firmware modules or firmware objects individually including a plurality of firmware instructions configured for execution by processor 21.

As shown, the instruction components include an input/output (I/O) subsystem 30, error subsystem 31, device state subsystem 32, event subsystem 33, filter interface subsystem 34, job manager subsystem 35, imaging subsystem 36 and engine subsystem 37. Following a boot operation of image forming device, a connection 38 is established coupling instruction components 30–37 and providing connectivity access and communication of data intermediate appropriate instruction components 30–37. Connection 38 interfaces with application program interfaces (APIs) 39 of respective instruction components 30–37. Individual instruction components 30–37 communicate with other subsystems using respective application program interfaces 39.

Referring to the individual instruction components, I/O subsystem 30 is configured to interface with host 4 via I/O port 16. For example, I/O subsystem 30 accepts image job data streams from host 4 and removes I/O specific data from the received data stream. Thereafter, I/O subsystem 30 presents the data stream to imaging subsystem 36 described below.

Error subsystem 31 receives error events from other instruction subsystems during operation of image forming device 6. Error subsystem 31 logs the received errors. In addition, error subsystem 31 may perform some recovery operations, display warnings, communicate with device state subsystem 32 to indicate the state and operation of image forming device 6, etc. Exemplary errors include low toner, low memory condition, etc.

Device state subsystem 32 monitors the state of image forming device 6. For example, device state subsystem 32 indicates image forming device 6 being in an on-line condition or an off-line condition.

Event subsystem 33 provides broadcast functions of events received from other instruction subsystems. For example, if a given subsystem wants to communicate with other subsystems it may post a given message to event subsystem 33 which in turn broadcasts the received message to the other identified instruction subsystems. Other instruction subsystems register with event subsystem 33 to receive event messages posted by other instruction subsystems.

The filter interface subsystem 34 provides an interface with which one or more filters may be dynamically installed or uninstalled as described in detail in U.S. patent application Ser. No. 09/181,033 having title "Filter Based Data Imaging Method For an Image Forming Device", naming Cooper G. Urie, John L. Boldon, and Todd A. Fischer as inventors, filed on Oct. 27, 1998, and incorporated herein by reference.

Job manager subsystem 35 arranges image jobs received within image forming device 6. In particular, job manager subsystem 35 may be referred to as a scheduler which orders image jobs for application to imaging subsystem 36 and engine subsystem 37.

Imaging subsystem 36 is operable to convert data which may be in the form of a sequence of instructions describing how marks should be made on a page into a rasterized representation of the page to be printed. In an exemplary configuration, imaging subsystem 36 includes a parser and a rasterizer to provide conversion operations of received data. Rasterized data is outputted from imaging subsystem 36 and applied to engine subsystem 37.

Engine subsystem 37 receives the rasterized data from imaging subsystem 36 and interfaces with the appropriate engine 18. Engine subsystem 37 communicates with the laser or other hardware device of engine 18 to implement imaging operations.

In the described configuration, a single dynamic application 40 is depicted. However, a plurality of dynamic applications 40 may be provided within an image forming device 6 at a given moment in time depending upon desired functionality or for providing additional operations. Dynamic applications 40 are dynamically installed and/or disabled (e.g., deleted) within image forming device 6 in the described configuration. For example, some dynamic applications comprise test applications which may be installed, used to test a desired operation of image forming device 6, and deleted. Such testing may occur in the factory before shipment of image forming device 6, or during testing of image forming device 6 in the field. Alternatively, dynamic applications 40 may be utilized for other operations or during other occasions wherein it is desired to add, modify, and/or delete program instructions to be executed by processor 21.

Installation and discovery of dynamic applications 40 by processor 21 are described below. Dynamic application 40 includes a plurality of executable instructions configured to cause processor 21 to associate dynamic application 40 with at least one of the instruction components 30–37 following discovery. According to some aspects of the present invention, dynamic application 40 causes processor 21 to perform one or more operations with respect to the at least one associated instruction component. According to other or additional aspects, dynamic application 40 is programmed to cause processor 21 to perform one or more task with respect to operations of image forming device 6.

For example, dynamic application 40 is configured, in exemplary arrangements, to perform any one of the following operations including capturing information, monitoring the state of image forming device 6, recording errors that occur during imaging operations, injecting itself into the data stream, gathering statistics, or additional operations which may be implemented by processor 21 via executable instructions. Such listed here are only exemplary operations of dynamic application 40 and other operations are performed by dynamic application 40 in other arrangements. Following usage of the appropriate dynamic application 40, such is typically disabled, including deleted or otherwise removed from image forming device 6. In other arrangements, dynamic application 40 remains installed within image forming device 6.

If dynamic application 40 is to be removed from image forming device 6, such can be implemented by various methods. For example, power cycling of device 6 removes applications from volatile memory, such as RAM. Available features associated with nonvolatile components (e.g., hard or floppy disk) are utilized to remove applications from such nonvolatile components. Alternatively, nonmanageable components which include applications may be unplugged from device 6.

Aspects of the present invention provide dynamic applications which leave no trace of previous installations upon a given device 6 following subsequent deletion or removal therefrom. Further, no modifications of device 6 are required in the described embodiment to install or delete the dynamic applications.

During execution of instructions of dynamic application 40, data may be compiled or otherwise generated (e.g., gathering statistics during operation of image forming device 6). For example, dynamic application 40 monitors the data stream and counts page boundaries, the number of PCL jobs and the number of PostScript™ jobs that are imaged. Dynamic application 40 is configured in some arrangements to cause processor 21 to store data for subsequent usage, either internally or externally of image forming device 6. For example, dynamic application 40 includes instructions in an exemplary configuration configured to cause processor 21 to send data to host device 4 using I/O port 16, spool data to hard disk 11, and/or broadcast the data to an Internet Protocol (IP) address. In exemplary configurations, the compiled data may be compared with expected results to determine if the system passes or fails a desired function in a test application.

In one configuration, dynamic application 40 is associated with filter interface subsystem 34 to access the data stream within image forming device 6. The data stream includes, for example, image jobs received from host 4 to be imaged. The data stream utilizes I/O subsystem 30, filter interface substation 34, imaging substation 36 and engine substation 37 in an exemplary arrangement.

To access the data stream, dynamic application 40 is associated with filter interface substation 34 upon runtime linkage in the described embodiment. Thereafter, dynamic application may access the data stream to monitor data therein, such as compiling statistics of jobs.

According to other aspects of the present invention, and following association of dynamic application with filter interface subsystem 34, new executable instructions, also referred to as commands, intended for dynamic application 40 may be retrieved from the data stream. In such an arrangement, host 4 downloads commands to I/O subsystem 30 and to filter interface subsystem 34. Dynamic application 40 identifies the commands and extracts the commands from the data stream. Thereafter, processor 21 is configured to execute the newly received command during execution of instructions of dynamic application 40. Such newly received commands provide flexible functionality including reconfiguring dynamic application 40 or causing dynamic application 40 to perform additional operations, for example.

Exemplary commands within the data stream extracted by the dynamic application 40 cause the dynamic application 40 to generate a job using data within the dynamic application and thereafter the content of the imaged job could be verified against an expected output. Another example is instructing dynamic application 40 to direct data resulting from execution of the dynamic application to disk 11 instead of directing the data to host 4 as previously utilized. Such examples are merely illustrative and other commands for reconfiguring operations of processor 21 executing dynamic application instructions are possible.

Thus, according to these aspects of the present invention, data as well as commands intended for the dynamic application may be communicated using the data stream of image forming device.

The discussion now proceeds with general reference to provision of dynamic applications within an image forming device 6. Image forming device 6 is arranged to receive, discover, install, and delete dynamic applications 40 according to exemplary aspects of the present invention. Such provides dynamic capabilities for altering or adding to base firmware 29 of image forming device 6. Initially, dynamic application 40 is downloaded to image forming device 6 from an external source, such as host 4. Host 4 communicates dynamic applications 40 to image forming device 6 using I/O port 16 comprising an input/output (I/O) interface. I/O port 16 comprising an I/O interface is configured to communicate image data (e.g., print job data) and the dynamic applications 40 externally of image forming device 6 including receiving into device 6 and outputting of such information from device 6.

Following receipt of image data within image forming device 6, engine 18 is instructed to provide the images upon media. Following the receipt of dynamic applications 40, such are discovered and associated or integrated with base firmware 29 as described further below. Thereafter, the operational instructions of dynamic applications 40 are executed by processor 21. Dynamic applications 40 may be deleted at subsequent points in time.

Figure 4:
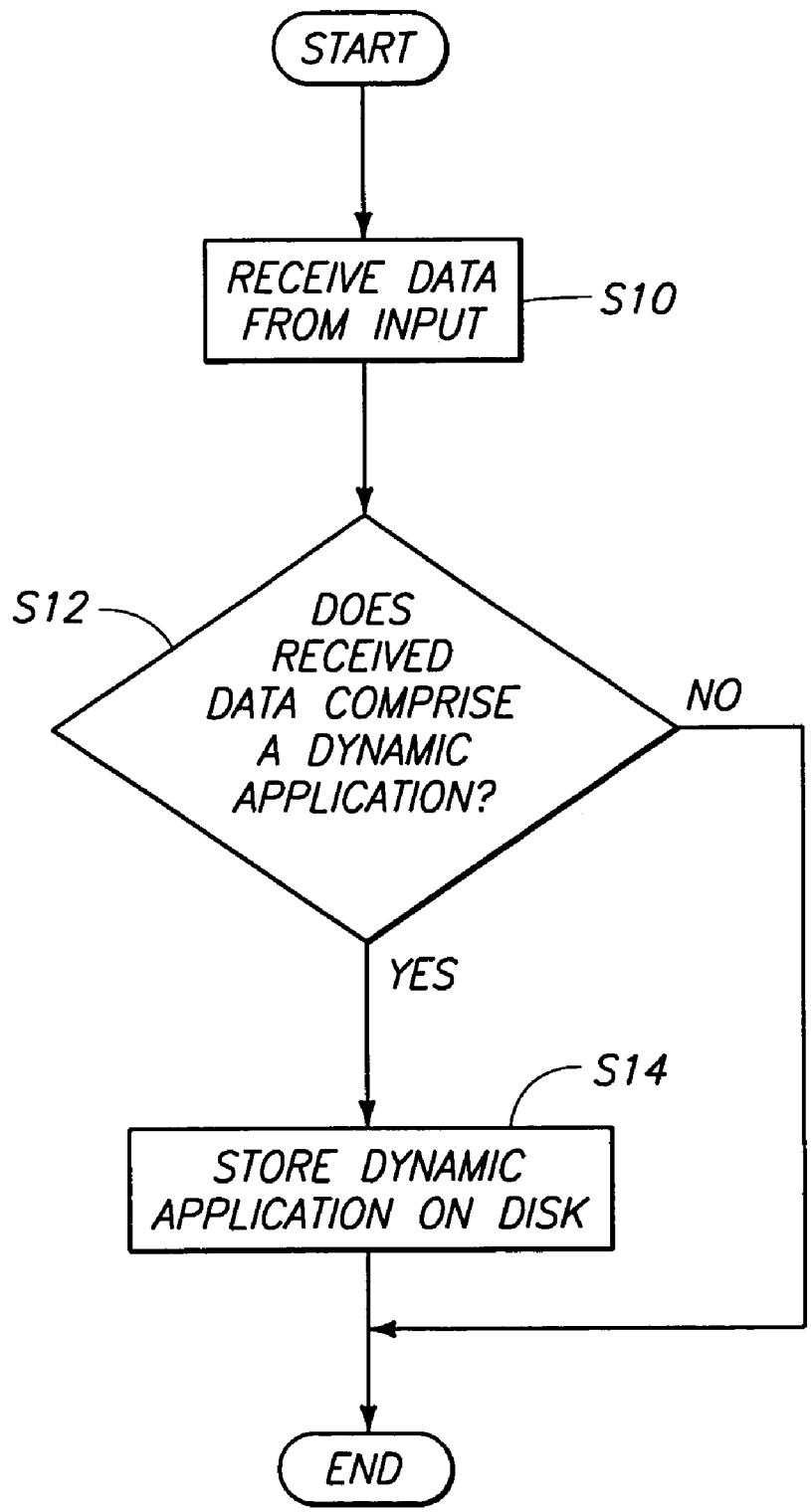
FIG. 4 is a flow chart depicting an exemplary methodology of dynamically downloading a dynamic application to the image forming device according to an aspect of the present invention.

Referring to FIG. 4, an exemplary methodology according to aspects of the present invention for downloading a dynamic application to image forming device 6 is illustrated and hereafter described.

At step S10, data is received from I/O port 16 and provided to I/O subsystem 30. A network file system comprising a network mounted disk (not shown) may be utilized to copy the file containing the dynamic application to image forming device 6.

At step S12, processor 21 executing instructions of I/O subsystem 30 determines whether received data comprises a dynamic application. For example, the dynamic application may be communicated to image forming device 6 as a PJL file system download command. Processor 21 executing instructions of I/O subsystem 30 identifies such an appropriate command.

At step S14, I/O subsystem 30 copies the received dynamic application to disk 11 or other appropriate storage device appropriate if the condition of step S12 is in the affirmative.

Figure 5:
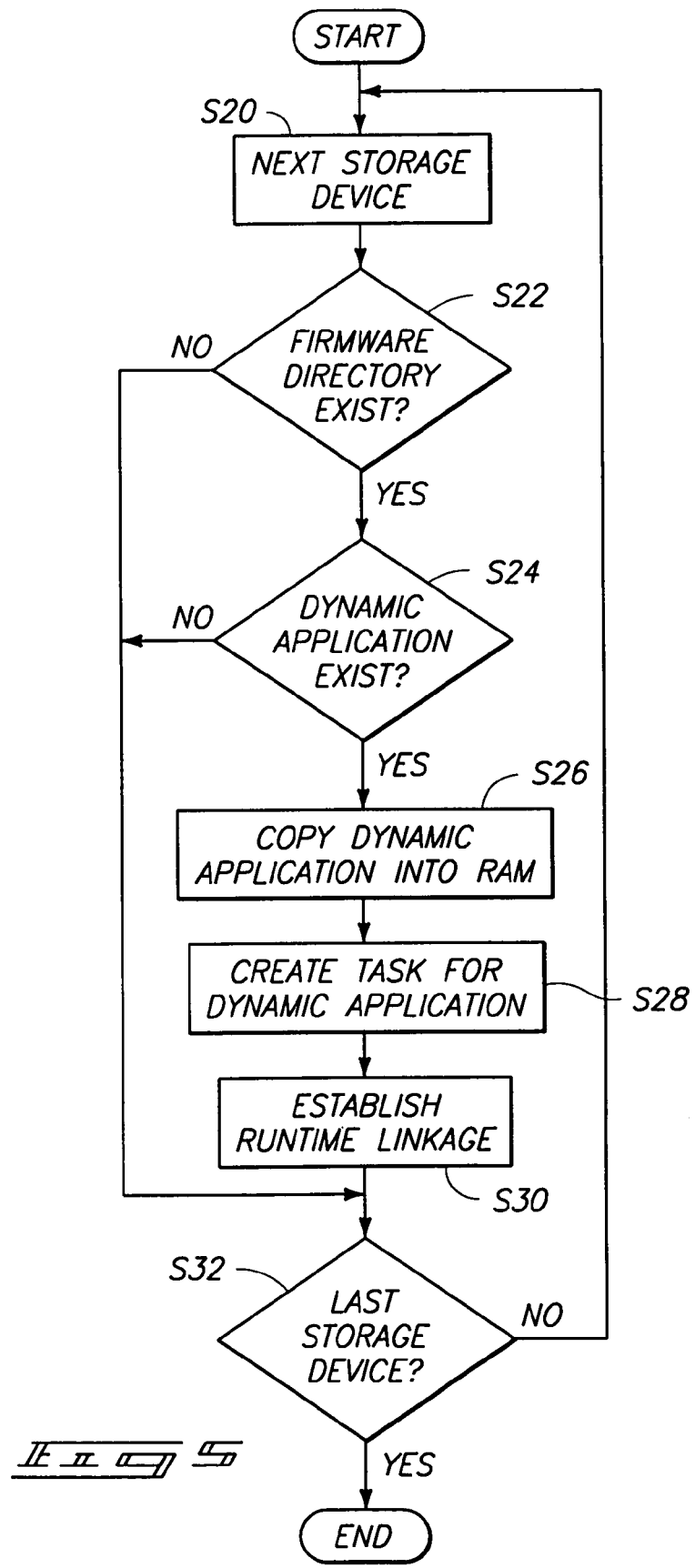
FIG. 5 is a flow chart illustrating an exemplary methodology of discovering and installing a dynamic application according to an aspect of the present invention.

Referring to FIG. 5, an exemplary methodology for associating, also referred to as installing or integrating, the dynamic application with respect to other instruction subsystems is illustrated. Dynamic applications are installed during a run time linkage operation in the described embodiment of the invention. Accordingly, following the downloading of a dynamic application to image forming device 6, a boot operation is initiated by the operating system (O/S) of the image forming device to provide the installation of the dynamic application with the other proper associated instruction components and execution of the dynamic application. Such may involve manual power cycling of image forming device 6, or a remote reboot command downloaded from host 4 to image forming device 6. Other installation methodologies of dynamic applications are possible.

At step S20, following a boot command, executable instructions cause the processor 21 of the image forming device to search to identify the presence of dynamic applications. Processor 21 selects a given one of storage devices of the storage configuration at step S20.

At step S22, processor 21 executing operating system instructions searches a firmware directory of the selected storage device.

If such directory exists in the selected storage device, processor 21 determines whether a dynamic application exists within the selected storage device at step S24.

If a firmware directory does not exist at step S22, processor 21 proceeds directly to step S32 as shown.

Further, if a dynamic application is not found within the appropriate firmware directory of the selected storage device, processor 21 proceeds directly to step S32.

Alternatively, if steps S22 and S24 are affirmative, processor 21 executing operating system instructions proceeds to step S26 to copy the discovered dynamic application into RAM 13.

At step S28, processor 21 executing operating system instructions creates a task for the dynamic application copied into RAM 13.

At step S30, processor 21 establishes a runtime linkage and associates the dynamic application with instruction components of base firmware 29 using operating system instructions. In described configuration, individual dynamic applications include executable instructions configured to cause the processor to identify at least one instruction component for association. The processor associates dynamic applications with application program interfaces of such identified instruction components in one exemplary arrangement. In the described configuration, processor 21 using the operating system establishes a runtime linkage of the dynamic application with respective application program interfaces of the appropriate instruction subsystems. Such may be referred to as late or runtime binding. Exemplary operations following association of the dynamic application with instruction components are discussed with reference to FIG. 6 and FIG. 7.

At step S32, processor 21 using the operating system determines whether the last storage device has been analyzed. If not, processor 21 proceeds to step S20 to analyze the next storage device. In the described embodiment, existing storage devices of storage configuration 10 are analyzed according to the FIG. 5 or other methodology.

Figure 6:
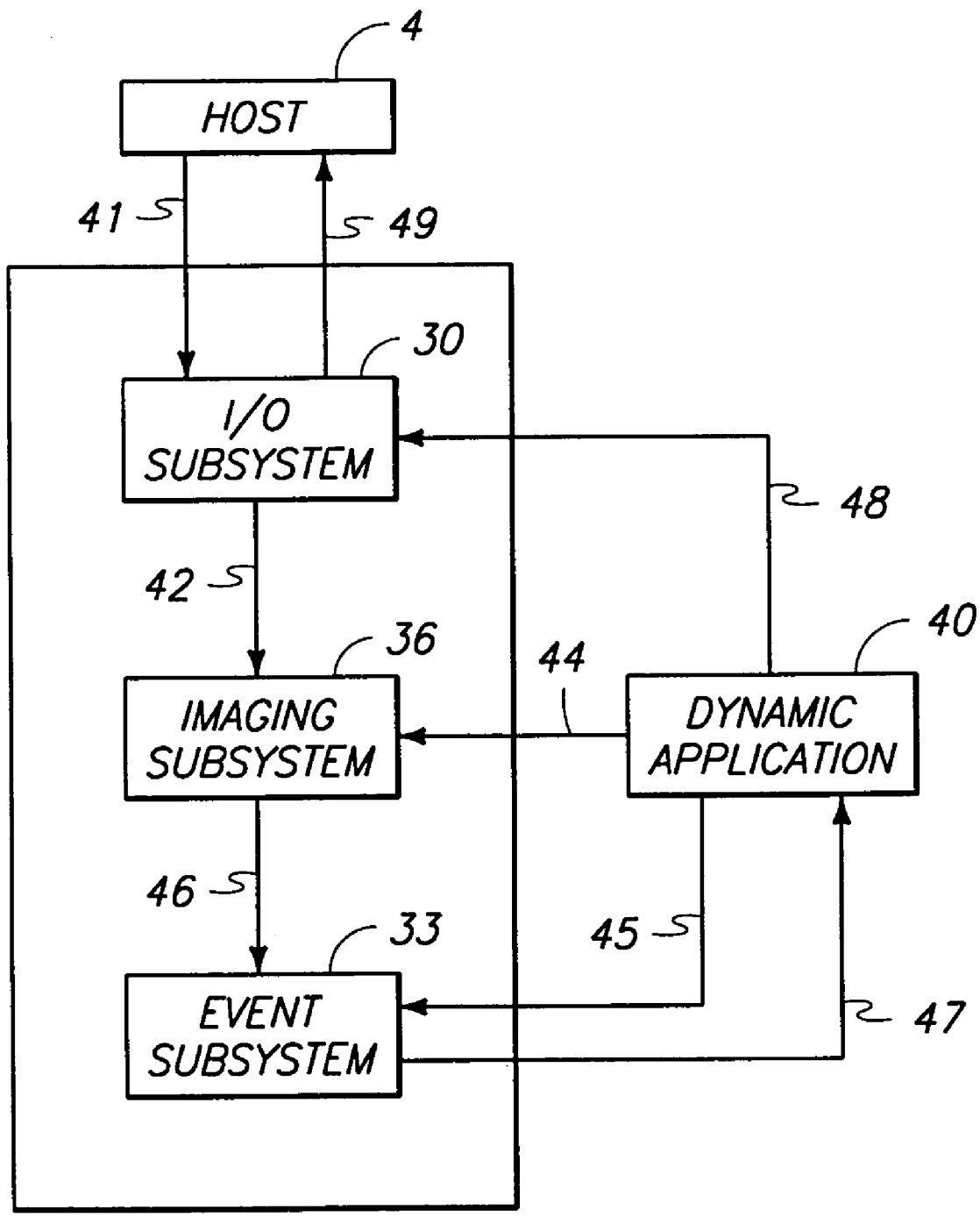
FIG. 6 is a collaborator diagram illustrating exemplary association of a dynamic application with instruction components of the image forming device.

Referring to FIG. 6, a dynamic application of the present invention may include instructions configured to cause processor 21 to perform a test of operations of device 6. For example, one dynamic application arrangement is configured to cause processor 21 to implement cyclical redundancy check (CRC) page operations within image forming device 6. In the described embodiment, dynamic application 40 includes instructions configured to cause the processor to perform the Page CRC operation during execution of instructions of an associated instruction component comprising imaging subsystem 36. The described Page CRC operations are exemplary. Other functionality or operations with respect to imaging or other operations of image forming device 6 are programmed within other dynamic application configurations.

Image forming device 6 operations of FIG. 6 are described following a boot procedure after a dynamic application has been downloaded to image forming device 6 and associated with the depicted instruction components including I/O subsystem 30, event subsystem 33, and imaging subsystem 36 of base firmware 29. Operations and interaction between appropriate instruction components and the dynamic application are represented by arrows.

Host 4 downloads an image job during operation 41 to I/O subsystem 30. During operation 42, processor 21 executing instructions of I/O subsystem 30 processes the received image job and forwards such to imaging subsystem 36. Via operation 44, processor 21 executing instructions of dynamic application 40 enables CRC events within imaging subsystem 36. Accordingly, CRC events are logged during processing of the imaging job comprising execution of instructions within imaging subsystem 36 by processor 21.

Processor 21, through instructions of dynamic application 40, registers with event subsystem 33 for notification of CRC complete events via an operation 45. Following completion of such CRC events, processor 21 executing imaging subsystem 36 instructions posts a CRC event complete message indicated by operation 46 to event subsystem 33. The CRC data resulting from processing operations of imaging subsystem 36 is also communicated during the operation 46 from imaging subsystem 36 to event subsystem 33 providing a bundled message and CRC data.

Using instructions of event subsystem 33, processor 21 notifies dynamic application 40 of the CRC complete event and forwards the CRC data as indicated by operation 47. During an operation 48, processor 21 executing instructions of dynamic application 40 writes the CRC data to I/O subsystem 30 after receiving the bundled CRC event during operation 47. Processor 21 executing I/O subsystem 30 instructions outputs the CRC data received during operation 48 via a back channel to host 4 during an operation 49 for use within host 4.

Referring to FIG. 7, the sequence of events of such a CRC dynamic application are shown. Initially, host 4 forwards an image job to image forming device 6 which is initially received and processed within I/O subsystem 30 by processor 21 as indicated by operation 41. Processor 21 executing instructions of I/O subsystem 30 forwards the image job to imaging subsystem 36 for imaging during operation 42. Processor 21 executing the installed dynamic application 40 enables CRC operations within imaging subsystem 36 in operation 44. Processor 21 executing dynamic application 40 also registers for CRC complete notification via event subsystem 33 at operation 45.

Processor 21 executes instructions of imaging subsystem 36 to perform imaging operations during a time period 52 wherein the image job is imaged and the CRC data is calculated. Processor 21 stores the data (e.g., CRC data) resulting from execution of dynamic application 40 with respect to operations of associated instruction components in an appropriate device (e.g., RAM 13, disk 11) of storage configuration 10. Processor 21 executing imaging subsystem 36 posts a CRC complete indication bundled with the CRC data to event subsystem 33 during operation 46.

Using event subsystem 33 instructions, processor 21 notifies dynamic application 40 of the CRC complete event via operation 47. Processor 21 executes dynamic application 40 instructions and writes the stored CRC data to I/O subsystem 30 during operation 48. I/O subsystem 30 instructions cause processor 21 to forward the CRC data to host 4 during operation 49 via the back channel of I/O port 16, and host 4 verifies the CRC data during a time period 54.

The protection sought is not to be limited to the disclosed embodiments, which are given by way of example only, but instead is to be limited only by the scope of the appended claims.

What is claimed is:

1. An image forming device comprising:
   a processor configured to process executable instructions;
   a storage configuration configured to store image data, plural instruction components, and a dynamic application, wherein the instruction components individually comprise plural executable instructions configured to cause the processor to perform an operation with respect to formation of images, and the dynamic application comprises plural executable instructions configured to cause the processor to associate the dynamic application with at least one of the instruction components and to perform an operation with respect to the at least one associated instruction component;
   an input/output interface configured to communicate the image data and the dynamic application externally of the image forming device;
   an engine configured to form images upon media responsive to the image data; and
   wherein the dynamic application is disabled after the operation is performed.

2. The device in accordance with claim 1 wherein the storage configuration is configured to store instruction components individually comprising plural firmware instructions.

3. The device in accordance with claim 1 wherein the input/output interface is configured to receive the dynamic application from externally of the image forming device.

4. The device in accordance with claim 1 wherein the storage configuration comprises executable instructions configured to cause the processor to identify the presence of the dynamic application.

5. The device in accordance with claim 1 wherein the dynamic application includes executable instructions configured to cause the processor to identify the at least one instruction component.

6. The device in accordance with claim 1 wherein the dynamic application includes executable instructions configured to cause the processor to store data with respect to execution of the dynamic application, and the input/output interface is configured to output the stored data.

7. The device in accordance with claim 1 wherein the dynamic application is configured to extract an instruction from a data stream of the image forming device and the processor is configured to execute the extracted instruction.

8. The device in accordance with claim 1 wherein the dynamic application includes executable instructions configured to cause the processor to associate the dynamic application with an application program Interface of the at least one associated instruction component.

9. The device in accordance with claim 1 wherein the dynamic application includes executable instructions configured to cause the processor to establish a runtime linkage of the dynamic application with an application program interface of the at least one associated instruction component.

10. The device in accordance with claim 1 wherein the dynamic application includes executable instructions configured to cause the processor to perform a Page CRC operation during execution of executable instructions within the associated instruction component comprising an imaging subsystem.

11. The device in accordance with claim 1 wherein the dynamic application includes executable instructions configured to cause the processor to perform a test of operations of the image forming device.

12. An image forming method comprising:
providing an image forming device including a processor and an engine configured to form images upon media;
providing plural instruction components individually including plural executable instructions configured to cause the processor to perform an operation with respect to the formation of images;
communicating a dynamic application relative to the image forming device;
associating the dynamic application with at least one of the instruction components, the dynamic application including plural executable instructions configured to cause the processor to perform an operation with respect to the at least one associated instruction component; and disabling the dynamic application.

13. The method in accordance with claim 12 wherein the providing the instruction components comprises providing instruction components individually comprising plural firmware instructions.

14. The method in accordance with claim 12 wherein the communicating comprises receiving the dynamic application within the image forming device.

15. The method in accordance with claim 12 further comprising identifying the presence of the dynamic application after the communicating.

16. The method in accordance with claim 12 further comprising identifying the at least one instruction component after the communicating the dynamic application, and the associating is responsive to the identifying.

17. The method in accordance with claim 12 further comprising:
storing data after the associating and with respect to execution of instructions of the dynamic application; and
outputting the stored data externally of the image forming device.

18. The method in accordance with claim 12 further comprising:
extracting an instruction from a data stream of the image forming device: and
executing the extracted instruction using the processor.

19. The method in accordance with claim 12 wherein the associating comprises associating the dynamic application with an application program interface of the at least one instruction component.

20. An image forming method comprising:
providing an image forming device including a processor and a print engine configured to print images upon media;
providing plural instruction components individually including plural executable instructions configured to cause the processor to perform an operation with respect to the formation of images;
receiving a dynamic application within the image forming device;
first identifying the dynamic application after the receiving;
second identifying at least one instruction component after the first identifying;
associating the dynamic application with the at least one instruction component after the second identifying, the associating including establishing a runtime linkage of the dynamic application with an application program interface of the at least one instruction component, the dynamic application including plural executable instructions configured to cause the processor to perform an operation with respect to the at least one associated instruction component including storage of data corresponding to the operation;
outputting the stored data from the image forming device; and
disabling the dynamic application.

21. The device in accordance with claim 1 wherein the plural executable instructions of the dynamic application comprise ordered instructions of an executable computer program which are executable according to an order of the executable computer program.

22. The method in accordance with claim 12 wherein the plural executable instructions of the dynamic application comprise ordered instructions of an executable computer program which are executable according to an order of the executable computer program.

23. The method of claim 20 wherein the plural executable instructions of the dynamic application comprise ordered instructions of an executable computer program which are executable according to an order of the executable computer program.

* * * * *

UNITED STATES PATENT AND TRADEMARK OFFICE
CERTIFICATE OF CORRECTION

PATENT NO. : 6,961,138 B1
APPLICATION NO. : 09/639450
DATED : November 1, 2005
INVENTOR(S) : Cooper G. Urie et al.

Page 1 of 1

It is certified that error appears in the above-identified patent and that said Letters Patent is hereby corrected as shown below:

IN THE CLAIMS

Column 10, Line 57, delete "Interface" and insert therefor --interface--

Column 11, Line 22, insert a paragraph break between "and" and "disabling"

Signed and Sealed this

Twentieth Day of May, 2008

JON W. DUDAS
*Director of the United States Patent and Trademark Office*